US007267872B2

(12) United States Patent
Lee et al.

(10) Patent No.: US 7,267,872 B2
(45) Date of Patent: Sep. 11, 2007

(54) BRAID-REINFORCED HOLLOW FIBER MEMBRANE

(75) Inventors: Moo-Seok Lee, Seoul (KR); Sung-Hak Choi, Kyunggi-do (KR); Yong-Cheol Shin, Seoul (KR)

(73) Assignee: Kolon Industries, Inc., Kwacheon (KR)

( * ) Notice: Subject to any disclaimer, the term of this patent is extended or adjusted under 35 U.S.C. 154(b) by 202 days.

(21) Appl. No.: 10/307,369

(22) Filed: Dec. 2, 2002

(65) Prior Publication Data
US 2003/0134550 A1    Jul. 17, 2003

(30) Foreign Application Priority Data
Dec. 7, 2001    (KR)    ............... 10-2001-0077181

(51) Int. Cl.
D02G 3/00    (2006.01)
B32B 15/00    (2006.01)
B29D 23/00    (2006.01)
B28B 21/00    (2006.01)

(52) U.S. Cl. ............... 428/376; 428/378; 428/398; 428/401; 428/34.1; 428/34.7; 428/34.6

(58) Field of Classification Search ............... 428/34.1, 428/34.5, 34.7, 36.3, 36.6, 36.7, 36.9, 376, 428/378, 398, 401, 297.1, 34.6
See application file for complete search history.

(56) References Cited

U.S. PATENT DOCUMENTS 4,385,017 A * 5/1983 Joh et al. ............... 264/41
5,472,607 A * 12/1995 Mailvaganam et al. ..... 210/490

* cited by examiner

*Primary Examiner*—Lynda Salvatore
(74) *Attorney, Agent, or Firm*—Birch, Stewart, Kolasch & Birch, LLP

(57) ABSTRACT

A braid-reinforced hollow fiber membrane which includes a reinforcing material of a tubular braid and a polymer resinous thin film coated on the surface of the reinforcing material. The polymer resinous thin film has a skin layer with micro pores having a diameter in the range from 0.01 to 1 μm and an inner layer of a sponge structure with micro pores having a diameter less than 10 μm.

The hollow fiber membrane exhibits excellent mechanical strength, reliable filtration and simultaneously, good water permeability.

12 Claims, 1 Drawing Sheet

BRAID-REINFORCED HOLLOW FIBER MEMBRANE

This nonprovisional application claims priority under 35 U.S.C. § 119(a) on Patent Application No. 2001-0077181 filed in KOREA on Dec. 7, 2001, which is herein incorporated by reference.

BACKGROUND OF THE INVENTION

1. Field of the Invention

The present invention relates to a polymer separation membrane having an excellent chemical resistance, filtration reliability, mechanical strength and water permeability, and more particularly, to a composite hollow fiber membrane.

Recently, polymer separation membranes are being utilized in more various fields as well as existing application fields with the improvement of their techniques. Particularly, with the importance of environment, demands for them are being increased in the fields of water treatment. In all application fields of separation membranes, a mechanical strength always stands out as an important factor as well as selectivity and water permeability. Particularly, in water treatment fields, an excellent mechanical strength is necessarily required, simultaneously with a high permeability, from the viewpoint of the reliability of a separation membrane system.

A hollow fiber-shaped membrane has a high permeability per installation area and is suitable for water treatment, whereas the mechanical strength thereof has been a problem to be solved due to the characteristics of a porous membrane structure. Thus, a hollow fiber membrane is reinforced with a fabric or tubular braid having an excellent strength as a support of the separation membrane.

2. Description of Related Art

Such a general idea of a composite membrane is a well known fact. Techniques thereof are disclosed in U.S. Pat. No. 4,061,821, U.S. Pat. No. 3,644,139, U.S. Pat. No. 5,472,607 and the like.

Among them, a general idea of a composite hollow fiber membrane using a tubular braid was disclosed for the first time in U.S. Pat. No. 4,061,821 to Hayano et al. In this technique, however, the tubular braid is not used as a support for coating, but it is completely embedded in the membrane in order to compensate for a reduction of water permeability due to the shrinkage occurred when an acrylonitrile hollow fiber type membrane is solely used at a temperature higher than 80° C. Such a composite membrane has a larger thickness than the thin film coated on a support, and the embedded braid increases the resistance of fluid flow for thereby significantly reducing the water permeability.

Unlike the prior art, in U.S. Pat. No. 5,472,607, a reinforcing material is not embedded in the membrane, but is coated on its surface with a thin film by coating method of the existing flat membrane. In manufacturing a composite hollow fiber membrane having a thin film layer coated on the surface of a reinforcing material or supporting material of a tubular braid, thermodynamic stability differs according to the composition of a dope to be used for coating. This determines the structure of the coated thin film layer.

That is to say, in case of a thermodynamically stable dope, it has a finger type structure. On the contrary, a dope with a low thermodynamic stability has a sponge structure with no defect region. For instance, in the case of a dope using a solvent having a strong solvent power such as N-methyl-2-pyrrolidone (NMP) among organic solvents, it can easily form a finger-type structure because it has a high thermodynamic stability.

Additionally, the water permeability and mechanical strength of the overall composite hollow fiber membrane depends upon the structure and properties of the thin film layer. This is because the thin film layer has small pores and a low mechanical strength than a tubular braid reinforcing material having relatively much larger pores and a higher strength. In other words, the filtrate having passed through the thin film layer passes through a braid supporting layer with relatively large pores without a large resistance. While, since the thin film layer has a large flow resistance, the water permeability of the overall membrane is determined according to a microporous structure and porosity of the thin film layer.

In view of strength, the tensile strength, pressure resistance and the like are complemented by the braid reinforcing material having a far superior mechanical strength. However, if the strength of the thin film is reduced, the thin film is separated or damaged.

In U.S. Pat. No. 4,061,821 and U.S. Pat. No. 5,472,607, the significance of the coated thin film layer structure was overlooked in relation to the present invention. Particularly, the structure of the thin film layer in the two U.S. patents has a porous region larger than 5 μm in an inner layer of a skin, that is, the inner layer has some micro pores having a pore diameter higher than 5 μm.

FIG. 2 is an exploded sectional view of a composite hollow fiber membrane disclosed in U.S. Pat. No. 4,061,821; and FIG. 3 is an exploded sectional view of a composite hollow fiber membrane disclosed in U.S. Pat. No. 5,472,607. These membranes are in a finger like structure as shown in FIGS. 2 and 3 and have a macrovoid functioning as a defect in the thin film layer as seen from the well-known fact.

Thus they acts as a defect in expressing the mechanical properties of the thin film. Particularly, when the skin of a dense layer is damaged, a material capable of being cut off by the inner layer is permeated. This reduces the relative filtration reliability of the membrane.

The composite hollow fiber membrane is suitable, particularly for filtration modules in the fields of water treatment due to its superior mechanical strength. In such a filtration module, there is a possibility of damaging the surface of the membrane by the friction and physical impact generated between membranes due to aeration.

It is an object of the present invention to provide a hollow fiber membrane having an excellent mechanical strength, filtration reliability, and water permeability by coating a polymeric resinous thin film on a braid support.

The present invention provides a hollow fiber membrane having a polymeric resinous thin film, including a skin layer of a dense structure and an inner layer of a sponge structure in which the diameters of the pores are continuously and gradually increased toward to the central axis of the hollow fiber, coated on the reinforcing material of a tubular braid.

In addition, the present invention provides a hollow fiber membrane which has a high porosity, good mechanical strength and filtration reliability as well as excellent water permeability by forming gradient-type micro pores smaller than 10 μm in the inner layer of a sponge structure of the hollow fiber membrane.

The polymer resinous thin film structure of the hollow fiber membrane of the present invention can be made by specifying the composition (including additives) of a spinning dope and regulating the thermodynamic stability of the spinning dope.

SUMMARY OF THE INVENTION

A hollow fiber membrane having excellent mechanical strength, filtration reliability and water permeability, according to the present invention, includes a reinforcing material made of a tubular braid and a polymer resinous thin film coated on the surface of the reinforcing material, said polymer resinous thin film having a skin layer with micro pores having a diameter in the range from 0.01 to 1 µm and an inner layer of a sponge structure with micro pores having a diameter less than 10 µm.

The present invention will now be described in detail.

The hollow fiber membrane of the present invention has a structure in which a polymer resinous thin film is coated on the surface of the reinforcing material of a tubular braid. The polymer resinous thin film includes a skin layer of a dense structure and an inner layer of a sponge structure. The skin layer is formed with micro pores having a diameter in the range from 0.01 to 1 µm. The inner layer is formed with micro pores having a diameter less than 10 µm, preferably, 5 µm.

The present invention contains no porous region larger than 10 µm (hereinafter we call it as "defect region") in the inner layer of the polymer resinous thin film, that is, there exist no micro pores having a diameter larger than 10 µm. In the case where any defect region larger than 10 µm exists in the inner layer, the filtration reliability can be greatly reduced. Preferably, the diameters of micro pores formed in the inner layer of the sponge structure are continuously and gradually increased toward to the central direction of the hollow fiber membrane.

To improve both mechanical strength and water permeability, it is preferable that the thickness of the polymer resinous thin film is less than 0.2 mm and the amount of the polymer resinous thin film penetration into the reinforcing material is less than 30% of the thickness of the reinforcing material.

The polymer resinous thin film is made from a spinning dope containing a polymer resin, an organic solvent, polyvinylpyrrollidone and a hydrophilic compound.

The hollow fiber membrane of the present invention can be made by passing a tubular braid (reinforcing material) through the center portion of a double tubular nozzle and simultaneously feeding a spinning dope for the polymer resinous thin film on the surface of the braid through the nozzle, coating the spinning dope on the braid, extruding them in the air of outside the nozzle, coagulating them in a external coagulating liquid to form the hollow fiber membrane, and washing and drying it.

At this time, the spinning dope for the polymeric resinous thin film is obtained by dissolving a polymer resin, polyvinylpyrrolidone and a hydrophilic compound in an organic solvent. The polyvinylpyrrolidone and hydrophilic compound is are used as an additive. More preferably, the spinning dope is made up of a polymer resin of 10 to 50% by weight, polyvinylpyrrolidone and a hydrophilic compound of 9 to 30% by weight and an organic solvent of 20 to 89% by weight. However, in the present invention, the composition ratio of the spinning dope is not specifically limited.

The polymer resin is a polysulfone resin, a polyethersulfone resin, a sulfonated polysulfone resin, polyvinylidenefluoride (PVDF) resin, polyacrylonitrile (PAN) resin, a polyimide resin, a polyamideimde resin, polyesterimide resin and so on. The organic solvent is dimethyl acetamide, dimethyl formamide or a solution thereof.

The hydrophilic compound is water or a glycol compound, more preferably, polyethylene glycol having a molecular weight of less than 2,000. Since the water or glycol compound, which is hydrophilic, reduces the stability of the spinning dope, it is relatively more likely to form a sponge structure.

That is, as the stability of the spinning dope becomes higher, it is more likely to form a finger-like structure because a defect region (micro pores having a diameter higher than 10 µm) is formed in the membrane. The present invention reduces the stability of the spinning dope by simultaneously adding a water or a glycol compound, and an additive, to increase the water permeability by making the membrane hydrophilic.

Meanwhile, in the process of producing the hollow fiber membrane, in order to uniformly coat a polymer resinous thin film on the surface of the reinforcing material of the tubular braid at a predetermined thickness, the speed with which the tubular braid is advanced and the quantity of the spinning dope introduced into the nozzle must be balanced with each other. The relation between the feed rate of a spinning dope and the speed of a tubular braid is expressed by the formula:

$$Q = \pi \rho \upsilon D_o T$$

[wherein Q denotes the feed rate of dope per time, $\rho$ denotes the density of dope, $\upsilon$ denotes the advancing speed of the braid, $D_o$ denotes the outer diameter of the braid and T denotes the thickness of the dope to be coated.]

As seen from the above formula, in the case where the advancing speed of the braid is high, a thin coating layer is formed. In the case where the advancing speed of the braid is extremely high relative to the feed rate of the spinning dope, a non-uniform membrane with no coating layer on some parts is produced. Otherwise, a non-uniform membrane with a partially thick coating layer is produced. Thus there exists an optimum speed ratio for stably producing a membrane with a uniform thickness.

Preferably, when the ratio (k) of spinning dope feed rate (Q) and braid advancing speed (v) with respect to a unit outer diameter ($D_o$) of braid satisfies the range from 200 to 3,000(g/m$^2$), an optimum coating is achieved. The larger the value of k becomes, the thicker the coating layer becomes.

$$k(g/m^2) = \frac{Q(g/min)}{v(m/min)D_0(m)}$$

The performance of the hollow fiber membrane produced when the k value satisfies the range from 500 to 2,500(g/m$^2$) is more preferable.

In the polymer resinous thin film layer of the hollow fiber membrane produced by the above-described method, a dense skin layer and an inner layer having a sponge structure are formed. The sponge structure of the inner layer becomes gradually larger as it approaches the center of the hollow fiber membrane and has no defect region greater than 10 µm. This can be observed in FIG. 1 showing an scanning electron microscopic photograph of the cross-section of the membrane by breaking out the polymer resinous thin film layer of the hollow fiber membrane produced according to the present invention.

As described above, since the hollow fiber membrane of the present invention is reinforced with a tubular braid and has no defect region greater than 10 µm in the inner layer of the polymer resinous thin film layer, it has an excellent water permeability, filtration reliability and mechanical strength.

In the present invention, the performances and structures of the hollow fiber membrane are evaluated by the following method.

Water Permeability

The water permeability was measured by preparing a mini-module having an effective length of 25 to 30 cm in the hollow fiber membrane and passing pure water through the module for a predetermined time by out-in flow method under a suction pressure of 100 mmHg at a temperature of 25° C.

Solute Rejectivity (Filtration Reliability)

The solute rejection rate was obtained by the following formula by dissolving hemocyanin (with a molecular weight of 2 millions) in a buffer solution, filtering it through a mini-module having an effective length of 25 to 30 cm in the hollow fiber membrane by cross flow method and measuring the concentration of permeated solution from the membrane and the concentration of original (unfiltered) solution by means of UV.

$$\text{Solute rejection rate}(\%) = \frac{\text{concentration of original solution} - \text{concentration of permeated solution}}{\text{Concentration of original solution}} \times 100$$

Mechanical Strength

The tensile strength, tensile elongation and the like of the hollow fiber membrane were measured by a tensile tester. A tensile test was carried out under a room temperature at a crosshead speed of 3 cm/min at a distance between chucks of 10 cm.

Shape of Micro Pores

The fractured cross-section of the polymer resinous thin film layer coated on the surface of the support (reinforcing material) was observed with an scanning electron microscope.

DETAILED DESCRIPTION OF THE EMBODIMENTS

Figure 1:
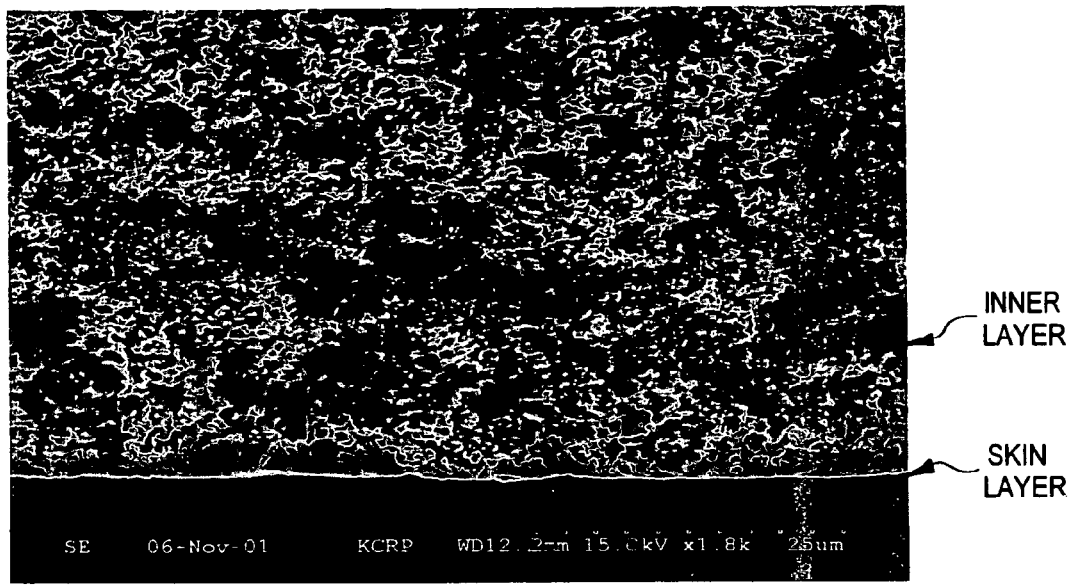
FIG. 1 is an scanning electron microscopic photograph showing the cross-section of a polymer resinous thin film of a hollow fiber membrane according to the present invention.
Figure 2:
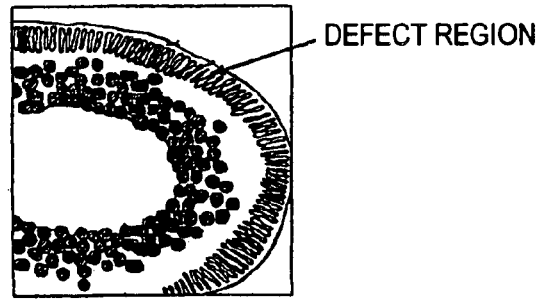
FIGS. 2 and 3 are exploded sectional views of a conventional hollow fiber membrane.
Figure 3:
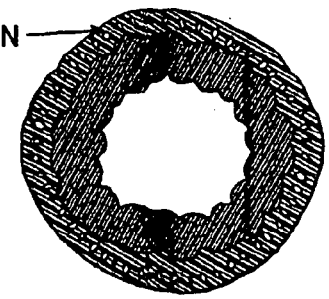

The present invention is now understood more concretely by comparison between examples of the present invention and comparative examples. However, the present invention is not limited to such examples.

EXAMPLE 1

A spinning dope is prepared from components: 17% by weight of polysulfone, 9% by weight of polyvinylpyrrolidone, and 10% by weight of polyethyleneglycol added to 64% by weight of dimethylformamide (organic solvent), to produce a transparent spinning dope by mixing and dissolving the components. The spinning dope is fed to a biannular nozzle having a 2.38 mmϕ diameter and simultaneously a tubular braid having an outer diameter of 2 mm is passed through the center portion of the nozzle, to thus coat the spinning dope on the surface of the annular braid and then extrude it in the air. At this time, the ratio (k) of the advancing speed of the braid to the feed rate of the spinning dope is 750 g/m², and the coating thickness of the spinning dope is 0.2 mm. After passing through the tubular braid coated with the spinning dope into a 10 cm air gap, it is coagulated in an external coagulating bath with a temperature of 35° C. The hollow fiber membrane is prepared by washing in a washing tank and winding. The result of evaluation for the structure and performances of the produced hollow fiber membrane is shown at Table 1.

EXAMPLE 2

A hollow fiber membrane is produced in the same process and condition as Example 1, except that the spinning dope is composed of 13% by weight of polysulfone, 10% by weight of polyvinylpyrrolidone, and 11% by weight of polyethyleneglycol and 66% by weight of dimethylformamide. The result of evaluation for the structure and performances of the produced hollow fiber membrane is shown at Table 1.

COMPARATIVE EXAMPLE 1

A hollow fiber membrane is produced in the same process and condition as Example 1, except that the spinning dope is composed of 17% by weight of polysulfone and 19% by weight of polyvinylpyrrolidone and 64% by weight of dimethylformamide (without adding polyethyleneglycol). The result of evaluation for the structure and performances of the produced hollow fiber membrane is shown at Table 1.

TABLE 1

Structure and Physical Properties of Hollow Fiber Membrane

| | Classification | | Example 1 | Example 2 | Comparative Example 1 |
|---|---|---|---|---|---|
| Physical Properties | Water Permeability(LMH) | | 150 | 250 | 60 |
| | Hemocyanin Rejection Rate (%) | $R_0$ | 89 | 83 | 91 |
| | | $R_{15}$ | 91 | 82 | 87 |
| | | $R_{30}$ | 89 | 84 | 78 |
| | Tensile Strength (g/fiber) | | 37 | 35 | 31 |
| | Tensile elongation (%) | | 65 | 60 | 57 |
| Structure | Thickness(mm) of Coated Thin Film | | 0.1 | 0.1 | 0.15 |
| | Defect Region larger than 12 μm | | none | none | exists |

In Table 1, $R_0$ denotes an initial hemocyanin rejection rate, $R_{15}$ denotes a hemocyanin rejection rate after 15 days under the condition of aeration with an air flow of 10 L/min, and $R_{30}$ denotes a hemocyanin rejection rate after 30 days under the condition of aeration with an air flow of 10 L/min As shown in Table 1, in Example 1 and Example 2, since $R_0$, $R_{15}$ and $R_{30}$ show values similar to each other, it can be known that there is no reduction in hemocyanin rejection rate in a case that the surface of the membrane is damaged. In other words, Example 1 and Example 2 show an excellent filtration reliability.

However, in Comparative Example 1, $R_{15}$ and $R_{30}$ show a value much lower than $R_0$. In other words, in Comparative Example 1 show a very poor filtration reliability.

INDUSTRIAL APPLICABILITY

The hollow fiber membrane of the present invention is reinforced with a support of a braid and has no defect region greater than 10 μm in the inner layer (sponge structure) of the polymer resinous thin film. Therefore, the water permeability, mechanical strength and filtration reliability thereof are excellent. As the result, the hollow fiber membrane of the present invention is particularly suitable for filtration modules in the fields of water treatment of a large size.

The invention claimed is:

1. A braid-reinforced hollow fiber membrane comprising a reinforcing material of a tubular braid and a polymer resinous thin film coated on the surface of the reinforcing material, said polymer resinous thin film consisting of two layers, a single skin layer with micro pores having a diameter in the range from 0.01 to 1 μm and a single inner layer of a sponge structure with micro pores having a diameter less than 10 μm.

2. The braid-reinforced hollow fiber membrane of claim 1, wherein the diameters of micro pores formed in the inner layer of the sponge structure is less than 5 μm.

3. The braid-reinforced hollow fiber membrane of claim 1, wherein the diameters of micro pores formed in the inner layer of the sponge structure are continuously and gradually increased toward the central direction of the hollow fiber membrane.

4. The braid-reinforced hollow fiber membrane of claim 1, wherein the thickness of the polymer resinous thin film is less than 0.2 mm.

5. The braid-reinforced hollow fiber membrane of claim 1, wherein the length of the polymer resinous thin film penetration into the thickness of the reinforcing material is less than 30% of the reinforcing material.

6. The braid-reinforced hollow fiber membrane of claim 1, wherein the polymer resinous thin film is made from a spinning dope containing a polymer resin, an organic solvent, a polyvinylpyrollidone and hydrophilic compound.

7. The braid-reinforced hollow fiber membrane of claim 6, wherein the polymer resin is selected from the group consisting of a polysulfone resin, a polyethersulfone resin, a sulfonated polysulfone resin, polyvinylidenedifluoride (PVDF) resin, polyacrylonitrile (PAN) resin, a polyimide resin, polyamideimde resin and a polyesterimide resin.

8. The braid-reinforced hollow fiber membrane of claim 6, wherein the hydrophilic compound is water or a glycol compound as a spinning dope stabilizer.

9. The braid-reinforced hollow fiber membrane of claim 8, wherein the glycol compound is polyethylene glycol having a molecular weight of less than 2,000.

10. The braid-reinforced hollow fiber membrane of claim 6, wherein the organic solvent includes dimethyl acetamide, dimethyl formamide or a solution thereof.

11. A braid-reinforced hollow fiber membrane, which comprises a reinforcing material of a tubular braid and a polymer resinous thin film coated on the surface of the reinforcing material, said polymer resinous thin film consisting of two layers, a surface of the reinforcing material, said polymer resinous thin film consisting of two layers, a single skin layer with micro pores having a diameter in the range from 0.01 to 1 μm and a single inner layer of a sponge structure with micro pores having a diameter of less than 5 μm, said hollow fiber membrane being produced by a method in which the ratio (k) of spinning dope feed rate (Q) and braid advancing speed (v) with respect to the a unit outer diameter ($D_o$) of braid, which is expressed by the following formula, satisfies the range of from 200 to 3,000(g/m²).

$$k(g/m^2) = \frac{Q(g/min)}{v(m/min)D_0(m)}$$

12. The braid-reinforced hollow fiber membrane of claim 11, wherein the ratio (k) of spinning dope feed rate (Q) and braid advancing speed (v) with respect to the a unit outer diameter ($D_o$) of braid satisfies the range from 500 to 2,500(g/m²).

* * * * *